US007219077B1

(12) United States Patent  
Black et al.

(10) Patent No.: US 7,219,077 B1  
(45) Date of Patent: May 15, 2007

(54) SYSTEM AND METHOD FOR CREATING MODEL INVESTMENT PORTFOLIOS

(75) Inventors: Neil W. Black, Redmond, WA (US); Peter Hansen, Bellevue, WA (US); Jon D. Markman, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1351 days.

(21) Appl. No.: 09/592,660

(22) Filed: Jun. 13, 2000

(51) Int. Cl.  
   *G06Q 40/00* (2006.01)
(52) U.S. Cl. .................................. 705/36; 705/37
(58) Field of Classification Search ............. 705/10–42  
See application file for complete search history.

(56) References Cited

U.S. PATENT DOCUMENTS

| | | | | |
|---|---|---|---|---|
| 5,148,365 A | * | 9/1992 | Dembo ........................ 705/36 |
| 5,706,502 A | * | 1/1998 | Foley et al. .................. 707/10 |
| 5,978,778 A | * | 11/1999 | O'Shaughnessy ............ 705/36 |
| 6,018,722 A | * | 1/2000 | Ray et al. ..................... 705/36 |
| 6,275,814 B1 | * | 8/2001 | Giansante et al. ............ 705/36 |
| 6,360,210 B1 | * | 3/2002 | Wallman ...................... 705/36 |
| 6,484,151 B1 | * | 11/2002 | O'Shaughnessy ............ 705/36 |
| 6,493,681 B1 | * | 12/2002 | Tertitski et al. .............. 705/36 |

OTHER PUBLICATIONS

"Mutual Fund Investor's", Center, WWW.MFEA.com, copyrigght 1996-2006.*

* cited by examiner

*Primary Examiner*—Frantzy Poinvill  
(74) *Attorney, Agent, or Firm*—Banner & Witcoff, Ltd.

(57) ABSTRACT

A system and method for creating portfolio is disclosed. A user is presented with an efficient method of creating a portfolio using predefined options. Through using the predefined options, the user may quickly create a portfolio that may be used to monitor a market.

31 Claims, 11 Drawing Sheets

SYSTEM AND METHOD FOR CREATING MODEL INVESTMENT PORTFOLIOS

1. BACKGROUND

1. Technical Field

The invention generally relates to financial systems. More particularly, the invention relates to a method and apparatus for creating an investment portfolio.

2. Related Art

Investing over the Internet has become commonplace. On-line brokers and brokerage sites enable all types of investors to engage in trading activities. These trading activities include trading stocks, options, etc. on the New York Stock Exchange, NASDAQ, American Stock Exchange, and foreign exchanges. In addition, investors may trade futures, currencies, mutual funds, and the like in respective exchanges.

In addition to trading over the Internet, investors may also track their investments over the Internet. Trading houses (for example, Ameritrade) allow investors to monitor the value of their account on-line. Some companies permit investors to create portfolios that permit monitoring of the portfolios over a period of time (for example, Yahoo! Finance). With Yahoo! Finance, however, investors are constrained to enter separately the quantity and purchase price of each stock. While allowing an investor to monitor accurately a stock or portfolio from a specific starting value, the exercise of separately entering each stock's quantity and purchase price can become tedious when creating watch accounts.

Watch accounts (also known as watch account portfolios or watch portfolios) are portfolios that have been created to monitor stocks (or, more generally, issues) over time. An example of a watch account is available at the Clearstation Internet website. Here, an investor may designate a watch account with a number of stocks and display how those stocks have changed since the watch account was first created. However, no method exists to assign an initial starting value to the watch account or to designate a number of shares purchased. Clearstation also supports the use of default values when creating a normal portfolio. The default values in Clearstation are defined as the quantity of shares needed to have a total investment in a stock be equal to $10,000. So, if one was to designate five stocks and select the default values option, the portfolio is created with enough shares of each stock so the initial investment in each stock was $10,000 on the day the stock was added to the account. However, the approach shown by Clearstation for using the default valuation of $10,000 for each holding fails to adequately mirror the monitoring situations needed by investors watching a stock or set of stocks. There is no provision for designating a fixed number of shares, designating a total valuation of a portfolio, or altering the date upon which the issues are initially priced. Because of these shortcomings, alternative methods of designating portfolios are needed.

2. SUMMARY

The present invention provides a system and method for creating model investment portfolios. Using the present invention, a user may quickly create a portfolio based on different criteria. In one embodiment, a user may create a portfolio for a hypothetical collection of stocks for monitoring market trends or to test out new investment strategies without risk. A user is provided with the option of specifying the date upon which the issues were purchased. This provides the user with the ability to back test investment strategies up to the present. Further, the values of the price of the issues may be split-adjusted to eliminate confusion over the quantity of shares purchase.

When creating a portfolio, a user selects a number of issues for inclusion in a portfolio. Next, the user determines how the quantity of each issue in the portfolio is to be selected. Different methods of selecting the quantity of the issues include designating an initial number of shares of each issue, a total valuation of the portfolio with the value allocated to each issue being equal, and other methods are disclosed.

These and other novel advantages, details, embodiments, features and objects of the present invention will be apparent to those skilled in the art from following the detailed description of the invention, the attached claims and accompanying drawings, listed herein, which are useful in explaining the invention.

3. BRIEF DESCRIPTION OF DRAWINGS

4. DETAILED DESCRIPTION

Although not required, the invention will be described in the general context of computer-executable instructions, such as program modules. Generally, program modules include routines, programs, objects, scripts, components, data structures, etc. that perform particular tasks or implement particular abstract data types. Moreover, those skilled in the art will appreciate that the invention may be practiced with any number of computer system configurations including, but not limited to, distributed computing environments where tasks are performed by remote processing devices that are linked through a communications network. In a distributed computing environment, program modules may be located in both local and remote memory storage devices. The present invention may also be practiced in personal computers (PCs), hand-held devices, multiprocessor systems, microprocessor-based or programmable consumer electronics, network PCs, minicomputers, mainframe computers, and the like.

Figure 1:
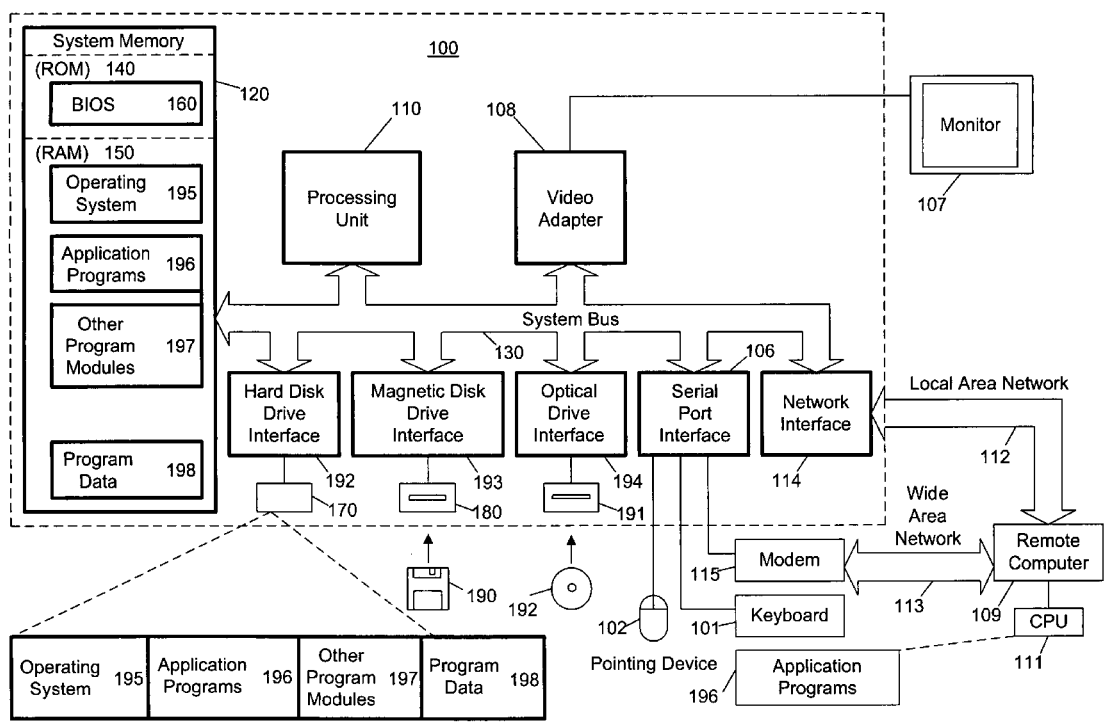
FIG. 1 shows a general purpose computer supporting the display and annotation of an electronic document in accordance with embodiments of the present invention.

FIG. 1 is a schematic diagram of a computing environment in which the present invention may be implemented. The present invention may be implemented within a general purpose computing device in the form of a conventional personal computer 100, including a processing unit 110, a system memory 120, and a system bus 130 that couples various system components including the system memory to the processing unit 110. The system bus 130 may be any of several types of bus structures including a memory bus or memory controller, a peripheral bus, and a local bus using any of a variety of bus architectures. The system memory includes read only memory (ROM) 140 and random access memory (RAM) 150.

A basic input/output system 160 (BIOS), containing the basic routines that help to transfer information between elements within the personal computer 100, such as during start-up, is stored in ROM 140. The personal computer 100 further includes a hard disk drive 170 for reading from and writing to a hard disk, not shown, a magnetic disk drive 180 for reading from or writing to a removable magnetic disk 190, and an optical disk drive 191 for reading from or writing to a removable optical disk 192 such as a CD ROM or other optical media. The hard disk drive 170, magnetic disk drive 180, and optical disk drive 191 are connected to the system bus 130 by a hard disk drive interface 192, a magnetic disk drive interface 193, and an optical disk drive interface 194, respectively. The drives and their associated computer-readable media provide nonvolatile storage of computer readable instructions, data structures, program modules and other data for the personal computer 100.

Although the exemplary environment described herein employs a hard disk, a removable magnetic disk 190 and a removable optical disk 192, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs), and the like, may also be used in the exemplary operating environment.

A number of program modules may be stored on the hard disk, magnetic disk 190, optical disk 192, ROM 140 or RAM 150, including an operating system 195, one or more application programs 196, other program modules 197, and program data 198. A user may enter commands and information into the personal computer 100 through input devices such as a keyboard 101 and pointing device 102. Other input devices (not shown) may include a microphone, joystick, game pad, satellite dish, scanner, or the like. These and other input devices are often connected to the processing unit 110 through a serial port interface 106 that is coupled to the system bus, but may be connected by other interfaces, such as a parallel port, game port or a universal serial bus (USB). A monitor 107 or other type of display device is also connected to the system bus 130 via an interface, such as a video adapter 108. In addition to the monitor, personal computers typically include other peripheral output devices (not shown), such as speakers and printers.

The personal computer 100 may operate in a networked environment using logical connections to one or more remote computers, such as a remote computer 109. The remote computer 109 may be another personal computer, a server, a router, a network PC, a peer device or other common network node, and typically includes many or all of the elements described above relative to the personal computer 100, although only a memory storage device 111 has been illustrated in FIG. 1. The logical connections depicted in FIG. 1 include a local area network (LAN) 112 and a wide area network (WAN) 113. Such networking environments are commonplace in offices, enterprise-wide computer networks, intranets and the Internet.

When used in a LAN networking environment, the personal computer 100 is connected to the local network 112 through a network interface or adapter 114. When used in a WAN networking environment, the personal computer 100 typically includes a modem 115 or other means for establishing a communications over the wide area network 113, such as the Internet. The modem 115, which may be internal or external, is connected to the system bus 130 via the serial port interface 106. In a networked environment, program modules depicted relative to the personal computer 100, or portions thereof, may be stored in the remote memory storage device. It will be appreciated that the network connections shown are exemplary and other means of establishing a communications link between the computers may be used.

In addition to the system described in relation to FIG. 1, the invention may be practiced on a handheld computer. Further, purpose-built devices may support the invention as well. In short, handheld computers and purpose-built devices are similar in structure to the system of FIG. 1 but may be limited to a display (which may be touch-sensitive to a human finger or stylus), memory (including RAM and ROM), and a synchronization/modem port for connecting the handheld computer and purpose-built devices to another computer or a network (including the Internet) to download and/or upload documents or download and/or upload annotations. The description of handheld computers and purpose-built devices is known in the art and is omitted for simplicity. The invention may be practiced using C. Also, it is appreciated that other languages may be used including C++, assembly language, and the like.

Figure 2A:
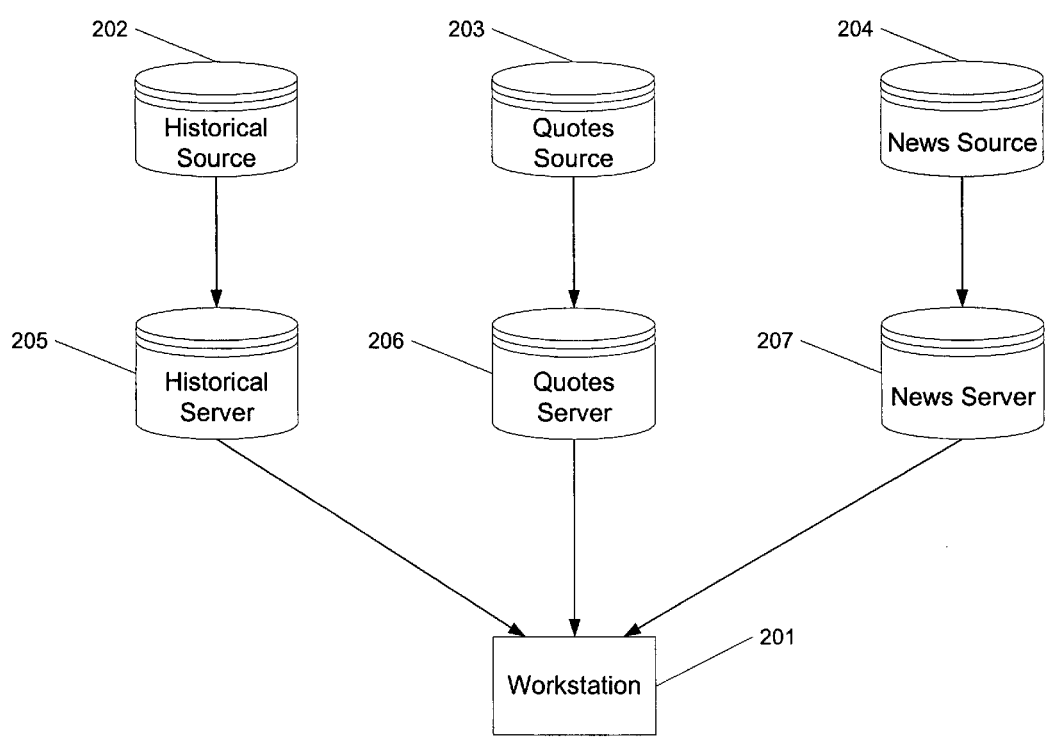
FIGS. 2A and 2B show systems for delivering financial information to workstations in accordance with embodiments of the present invention.

FIG. 2A shows a system for delivering financial information to a workstation in accordance with embodiments of the present invention. A user receives financial information at workstation 201 from a set of backend servers—205, 206, and 207. These servers receive financial data from a variety of sources. The sources are well known in the art and are listed here for reference. Historical database 202 provides historical information of stocks including the closing prices and volume of trades for every trading day over the past number of years. This historical data covers prices for stocks and mutual funds, as well as major indexes such as the S&P 500, the Dow Jones Industrial Average, and the like. Quotes source 203 provides the Quotes server 206 with current information regarding issues including current trading values, volumes, percent changes, and the like. News source 204 provides news stories for traded issues to News Server 207.

Workstation 201 includes a system for receiving and displaying received financial information from the various backend servers 205, 206, and 207. It is appreciated that all connection pathways may include the Internet. In one embodiment, workstation 201 includes a stand-alone software package that displays the financial information from the backend servers 205, 206, and 207. This software package may be a financial software package including Intuit's Quicken or Microsoft's Money. In an alternative embodiment, workstation 201 is running an Internet browser capable of accessing information across the Internet. The browser may be Netscape 4.6 by the Netscape Corporation or Internet Explorer 5.0 by the Microsoft Corporation. The backend servers 205, 206, and 207 may be connected to the Internet and provide a site for access by investors at workstations 201 to create and manage portfolios as are known in the art. An example of a site is Yahoo! Finance by Yahoo! and Moneycentral by MSN. These sites provide an investor with the ability to receive current information regarding issues in his portfolio.

Figure 2B:
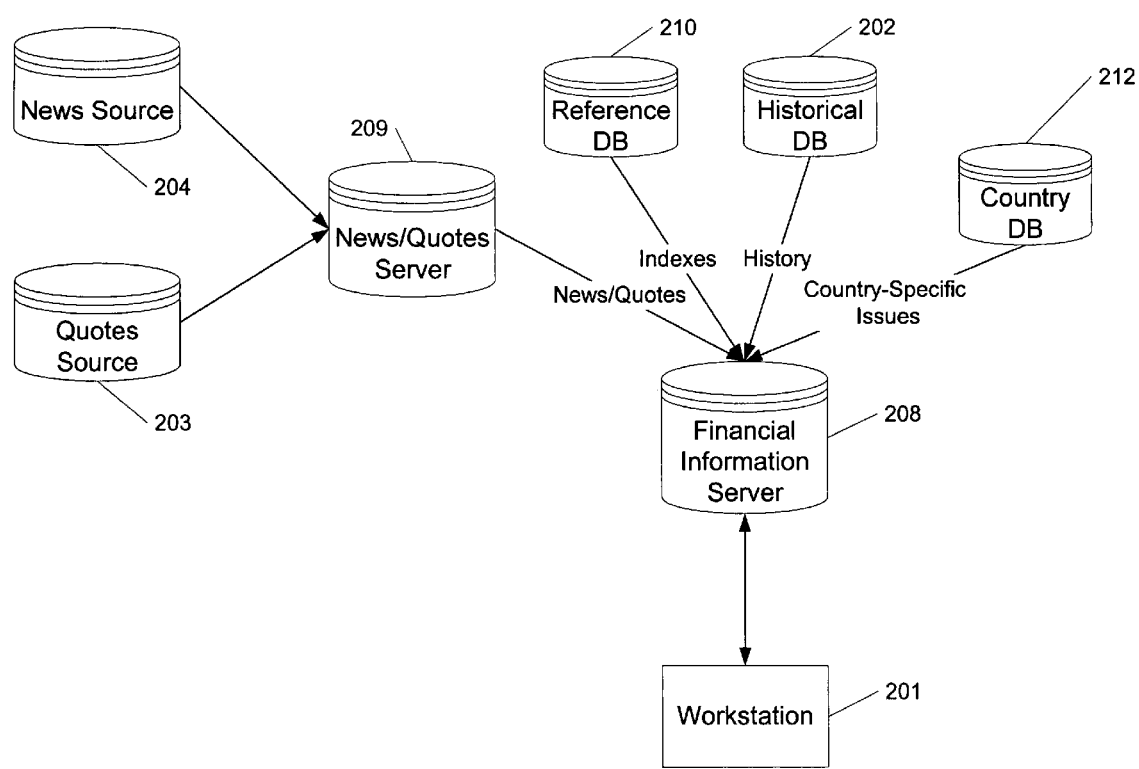

FIG. 2B shows an alternative system for delivering financial information to a workstation in accordance with embodiments of the present invention. A user receives financial information at workstation 201 from a financial information server 208. The financial information server receives information from other databases and servers. The sources are well known in the art and are listed here for reference. Reference database 210 provides reference information to the financial information server 208. Country database 212 provides country-specific information when needed. For example, country database 212 may provide information to financial information server 208 when the markets close in the respective countries. Quotes source 203 and News source 204 provide the News/Quotes server 209 with current information regarding issues including current trading values, volumes, percent changes, and the like. In this embodiment, the workstation 201 may connect directly to and receive information from the financial information server 208 without needing to accommodate information arriving from other sources.

Figure 3:
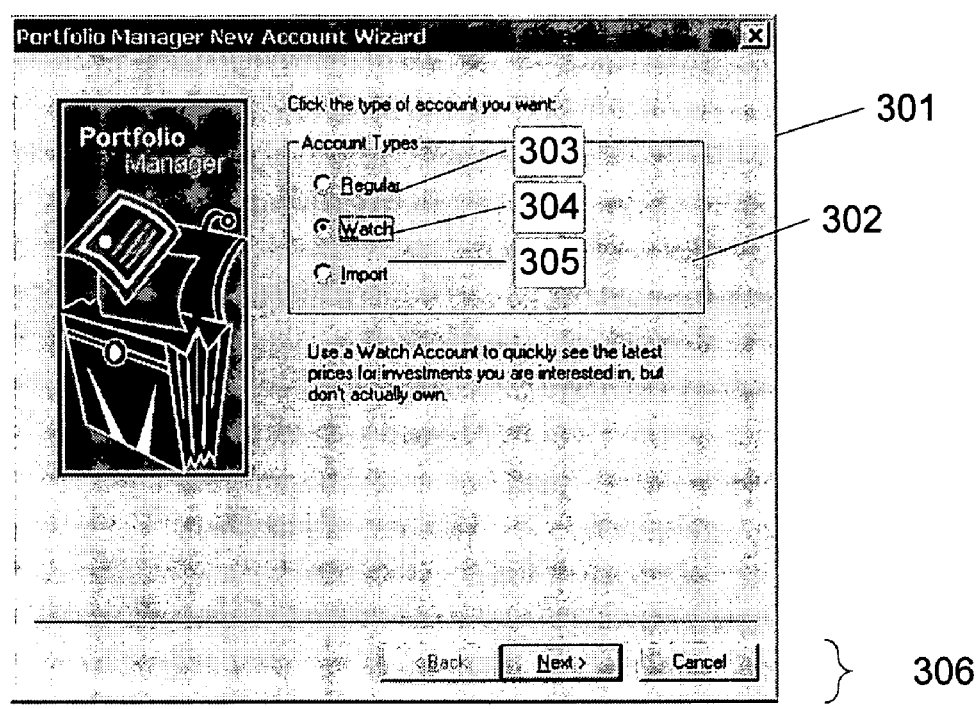
FIGS. 3 to 7 show user interfaces for creating a portfolio in accordance with embodiments of the present invention.

FIGS. 3 to 7 show user interfaces for creating a portfolio in accordance with embodiments of the present invention. The user interfaces may be used when accessing one of the above sites to allow investors to easily set up portfolios. The interfaces may be downloaded as HTML pages with information being posted back to the server for processing. Alternatively, the interfaces may be part of local program developed to minimize the processing to be accomplished by the server. For example, the interfaces may be programmed in Java or ActiveX or any other language as known in the art that may run in a browser running on workstation 201. For instance, to create a model portfolio, the user may access the MoneyCentral site. From the MoneyCentral home page, the user clicks on the "My Portfolio" link, which takes them to the ActiveX Portfolio Manager. The ActiveX control is an executable program that runs on the client machine and communicates with a server using HTTP requests. The MoneyCentral Portfolio Manager runs as an ActiveX control when the user is accessing the site using Internet Explorer 3.0 or higher OR Netscape Navigator 3.0 or higher on Win 95/98 or Windows NT. From the Portfolio Manager the user clicks on the File menu and chooses the "New Account . . . " option. This action brings up the dialog box as shown in FIG. 3.

FIG. 3 shows a user interface 301 after a user has indicated she wants to create a new account or portfolio. A variety of types of accounts may be displayed in "Account Type" box 302, with each having a user interface portion for receiving a user's selection. The interface 301 provides the user with the option of creating a new regular account 303, a new watch account 304, or import an existing account 305. Section 306 provides a user interface portion for receiving user navigational inputs. Once a user has selected the type of account desired, the user is directed to the user interface of FIG. 4.

As used herein, a normal or regular account is an account in which a user actually owns the issues as entered into the account. A watch account, on the other hand, is an account in which the user does not actually own the issue or the quantity of issues or the allocation of issues in the account. A "model" account allows the user to specify a portfolio based on some predefined allocation of resources. The allocation may include an equal number of shares of each investment or it may be a total portfolio value distributed among the investments or it may be based on one of the allocation techniques described herein. A model account may relate to an account that is created to reflect an investor's ideal investment account. The model creation allocation system may be applied to both regular (normal) accounts and watch accounts. Where permitted, the purchase of issues based a model method may allow for selection of non-whole numbers of shares. Alternatively, the system may also include the ability to round up or round down the number of shares to be purchased to accommodate actual purchase requirements of different exchanges.

In one embodiment, only one type of account may exist with the option of making it a model account. This system makes it simple for a new user to establish accounts without having to separate out watch accounts from regular accounts. In another embodiment, watch accounts are separately defined from regular accounts. One advantage of keeping regular accounts separate from watch accounts is in the computation of realized gain for the account.

Figure 4:
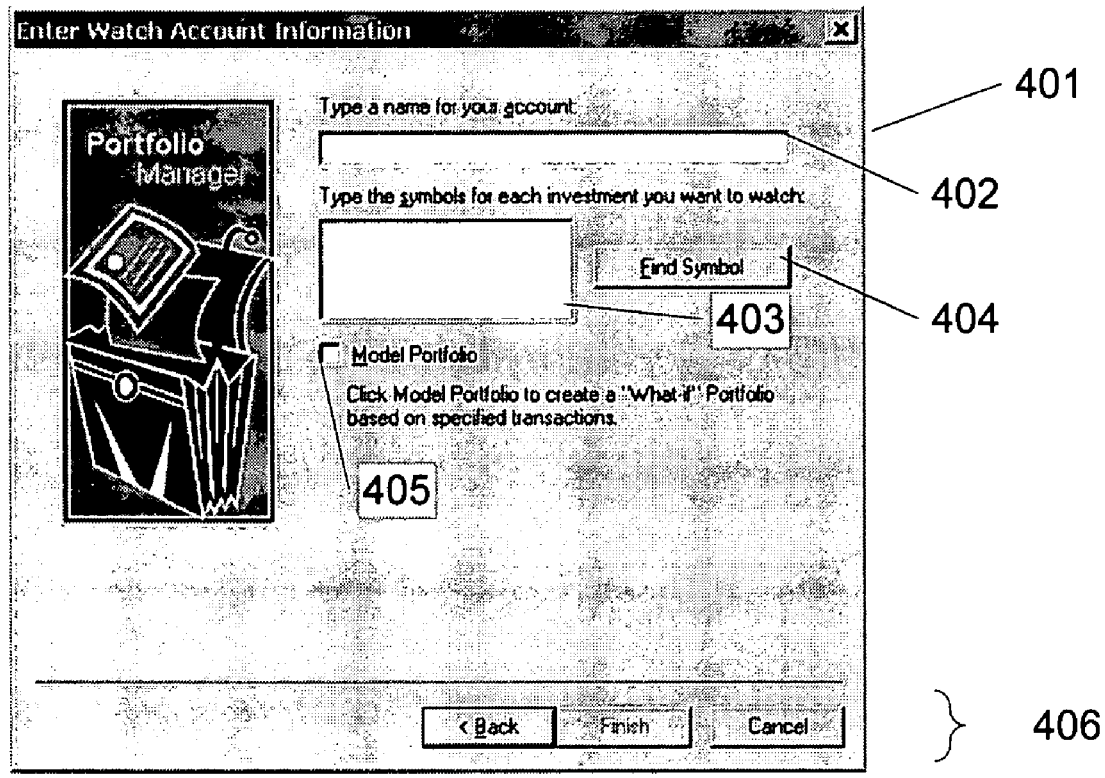

FIG. 4 shows a user interface 401 for designating the name of the account and the issues contained within the account. User interface portion 402 receives a user input designating the name of the account. User interface portion 403 receives a user input designating the type of issues to be included within the account. If a user does not know the symbol associated with an issue, the user may search for the symbol through a search feature. The search feature may be enabled through button 404. However, for simplicity, the search feature is not described herein. In one embodiment, a user may indicate that he wants to create a model portfolio, in which the user may test investing strategies without risk. To designate the model portfolio as such and to allow for easier creation of the model portfolio, a user checks a check box 405. It is appreciated that other user interface portions may be provided including buttons, radio buttons, and other like selection techniques that are known in the art. Navigation buttons 406 are used to control navigation and permit forward navigation once a specified number of fields (402 and 403) have been populated.

Figure 5:
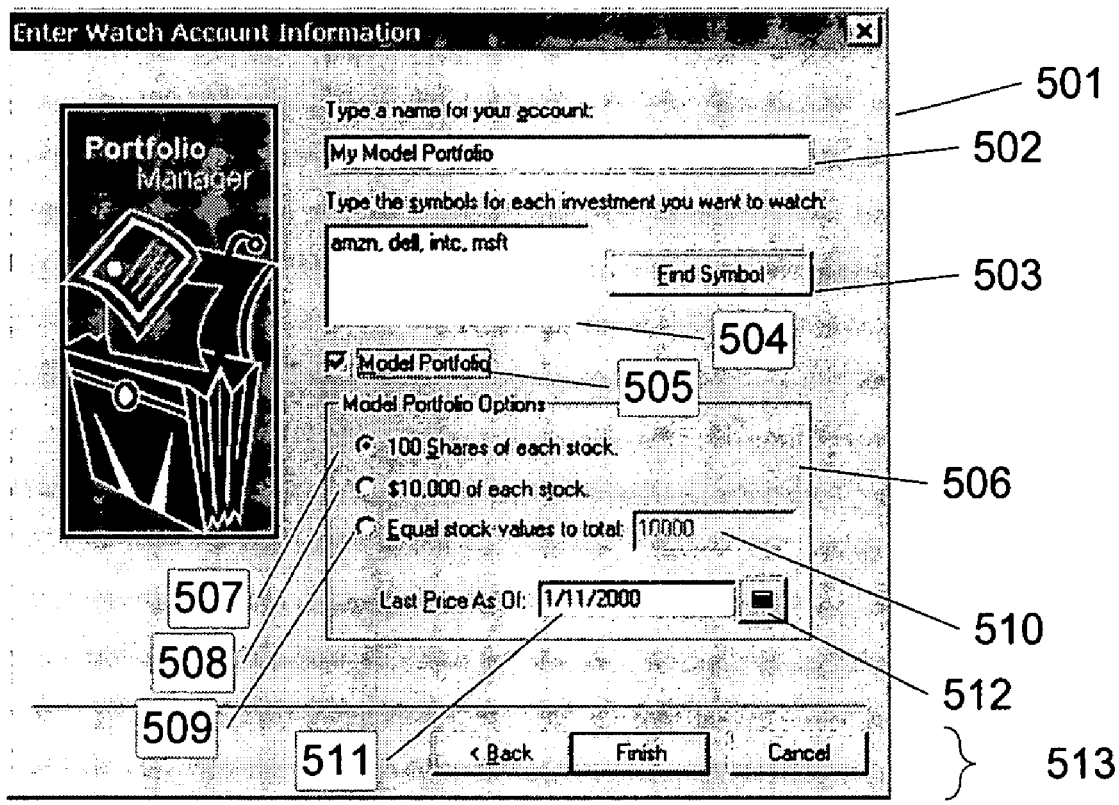

FIG. 5 shows the user interface of FIG. 4 with fields populated. Specifically, user interface window 501 includes the name of the account user interface portion 502 with the account named "My Model Portfolio". User interface portion 504 includes the names of four issues including Amazon.com (amzn), Dell Computers (dell), Intel Corporation (intc), and Microsoft Corporation (msft) (the symbol search button 503 also remains visible). Here, the Model Portfolio box 505 has been checked. Once checked, new user interface portion 506 having options available for configuring a model portfolio is displayed. In an alternate embodiment, model portfolio box 505 may be eliminated as population of any of the interfaces in portion 506 may enable the model portfolio designation of the account.

User interface portion 506 provides a number of selectable options for configuring the model portfolio. First, selection of option 507 permits a fixed quantity of each issue to be purchased. If this option was selected, 100 shares of each of the above issues will be included in the portfolio. The option is shown with an initial designation of 100 shares of each stock. In an alternate embodiment, another user interface portion is provided that permits a user to select the number of shares of each to be added (for example, 10 or 1000 shares of each).

Second, selection of option 508 permits a fixed amount of money be allocated to each issue. As shown in FIG. 5, $10,000 is applied to each stock. Applied to the four above stocks, $10,000 of each would be added to the portfolio. In an alternative embodiment, a user definable value may be substituted for the initial $10,000 figure. The user definable value may be set via a dialog box, drop down menu listing predefined values, and the like.

Third, selection of option 509 permits designation of a total portfolio value. The initial value may be set to $10,000, for example. Alternatively, there may be no initial value specified, instead waiting for user input (e.g., in value entry box 510). Further, option 509 may include a drop down menu listing predefined values including, for instance, $10, $50, $100, $500, $1000, $10,000, $100,000 and the like.

It is appreciated in the above drop down menu examples, any values may be specified and the listed values are not intended to be the only values usable in the described embodiment.

The options shown in interface portion 506 are but a few of the options for specifying how many shares should be purchased. The following lists the above options and others. It is appreciated that other options for deciding how many shares to purchase are available and considered within the scope of the invention.

1. Specify the total number of shares in each issue.
   1.1 The number of shares to purchase is predefined.
   1.2 The number of shares to purchase is definable by the user.
2. Specify the value of each issue to be purchased.
   2.1 The value of each issue is predefined.
   2.2 The value of each issue is definable by the user.
3. Specify the value for the portfolio
   3.1 The value of the portfolio is fixed to a predefined value (e.g., $10,000).
   3.2 The value of the portfolio is definable by the user.
4. Weight the allocation of the issues in a portfolio as based on criteria (e.g., purchase more of one issue than another in the same portfolio).
   4.1 Even distribution
   4.2 Market Capitalization (e.g., purchase more issues that have a greater market capitalization than issue that have a lesser market capitalization)
   4.3 Risk (e.g., purchase more issues having a higher risk than having a lower risk)
   4.4 Industry Sector (e.g., purchasing more issues of technology stocks than textile stocks)
   4.5 PE Ratio (e.g., purchasing more issues with a higher PE ratio than a lower PE ratio)
   4.6 Value (e.g., purchasing more issues with a greater cost per share than a lesser cost per share)
   4.7 Dividends (e.g., purchase more of issues that pay dividends than those that do not pay dividends)
   4.8 Weighting based on recommendations from industry analysts As to the various weighting factors, a user may specify how to weight the purchase of the stocks. Also, the user may specify whether the weighting should be applied to a given portfolio.

Further, portfolio options window 506 includes interface 511 and selection button 512. Interface 511 permits designation of a day from which the last trade price is determined. A user may enter a date in interface 511. Alternatively, a user may select button 512 and receive a navigable calendar that permits a graphical selection of a date. Finally, navigation buttons 513 are provided.

Figure 6:
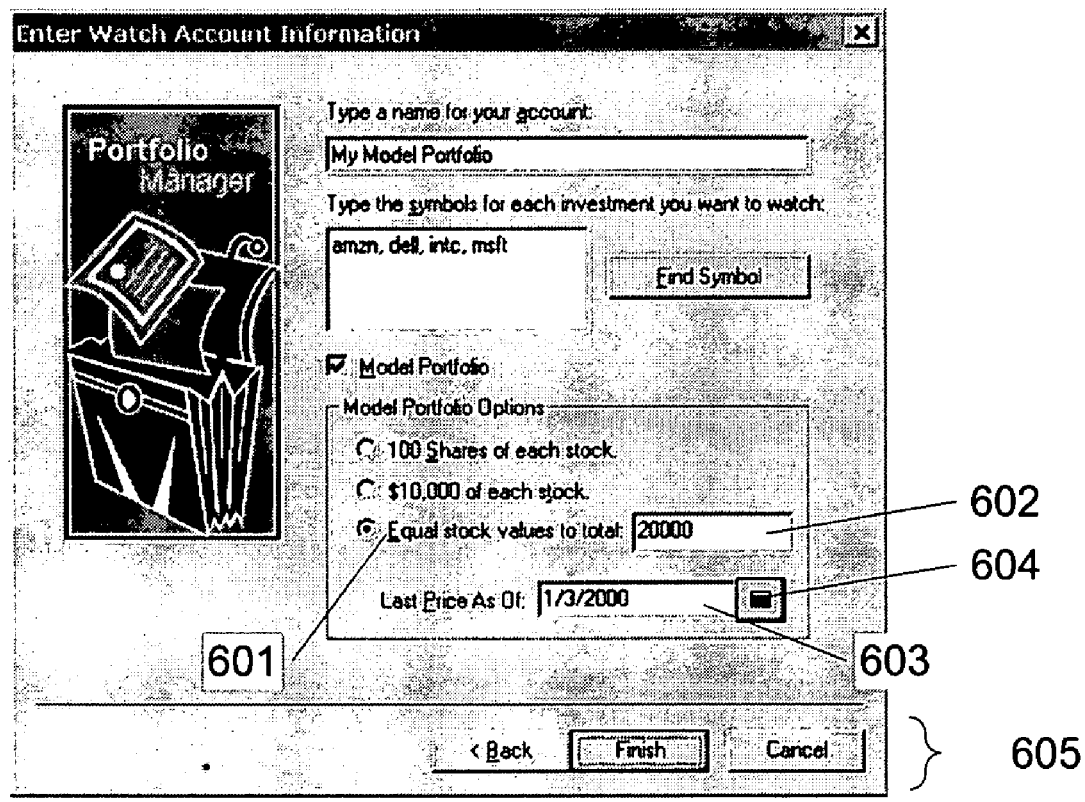

FIG. 6 shows a user interface similar to that of FIG. 5 but with separate options selected. Here, option 509 has been selected (as shown as 601) with a new value for each stock in box 602 ($20,000 as compared to the $10,000 in FIG. 5). Further, the date in user interface portion 603 has been changed from Jan. 11, 2000 (FIG. 5), to Jan. 3, 2000. The button 604 to activate a navigable calendar remains visible.

When the finish button in 605 is pressed, the client-side ActiveX sends a request to the server to get closing prices on Jan. 3, 2000 for each of the stocks in the model portfolio account. The server sends the data back to the client machine where the ActiveX control uses it to calculate the number of shares of each stock to purchase.

The ActiveX control will calculate the number of shares required to purchase $5,000 of each stock so that the total account value is $20,000. Since model portfolios are used for simulation, the number of shares to be added is not rounded to whole numbers, but rather fractional shares are added to the account. In this example the following transactions will be added to the "My Model Portfolio" account:

| Issue | Closing Price as of Jan. 3, 2000 | Number of Shares to Purchase to Set Value Initially at $5,000 |
| --- | --- | --- |
| AMZN | $89.375 | 55.944 |
| DELL | $50.875 | 98.28 |
| INTC | $87 | 57.471 |
| MSFT | $116.563 | 42.895 |

Once these calculations have been made on the client machine using the ActiveX control, the transactions are written to the users data file, which resides on the client workstation 201. The user can then see the account displayed in the Portfolio Manager 701 as shown in FIG. 7.

Figure 7:
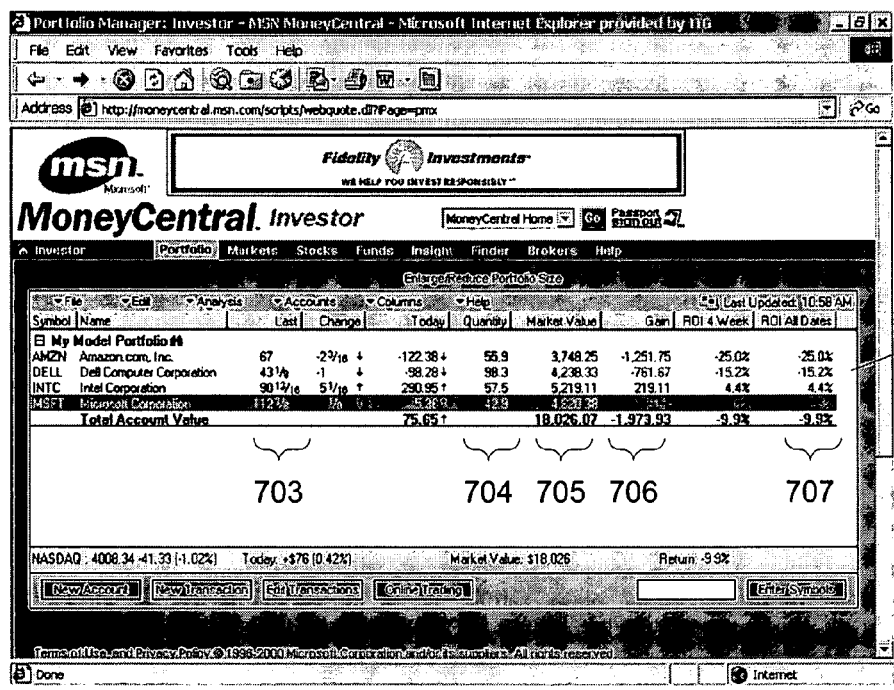

FIG. 7 shows a resulting view after completing the account designated by the user interfaces of FIGS. 3 to 6. The portfolio is shown in the Portfolio Manager 701 in a browser. Grouping 702 shows the four stocks described above. Display portion 703 shows the last price of the stocks. Display portion 704 shows the quantity purchased for the stocks. Display portion 705 shows the current market value of the stocks in 702. Display portion 706 shows the gain computed from the difference between the current market value and the original purchase value of the stock. Display portion 707 shows the percentage gain realized on the investment for each stock on 702.

In the above description, model watch accounts are differentiated from normal accounts. Providing normal accounts with the ability to specify purchase amounts and purchase prices enables investors to accurately reflect their actual portfolios. The model options in window 506 simplify the method for establishing portfolios in which (for instance) no real money is actually invested. However, in an alternative embodiment, the options available in window 506 may be applied to normal accounts and non-model, watch accounts as well. In this latter embodiment, a user may have the option of entering the quantity of each issue held as well as a quantity, or merely entering the issue and letting the system select the quantity or value applied to the issue or issues. Permitting normal accounts to be established, based on predefined options, allows simplified creation of the accounts. An implementation of this latter embodiment may be in the field of day trading.

To assist day traders with making purchases quickly, the system may include the ability to store preferences for portfolio creation. For example, if a day trader likes to purchase all issues in batches of 500, the system may populate the indication of the number of shares to be purchased at 500. So, when quickly specifying a trade, the trader does not need to separately enter his or her selection criteria repeatedly. The preferences may be stored on the server or may be stored on the client.

Figure 8:
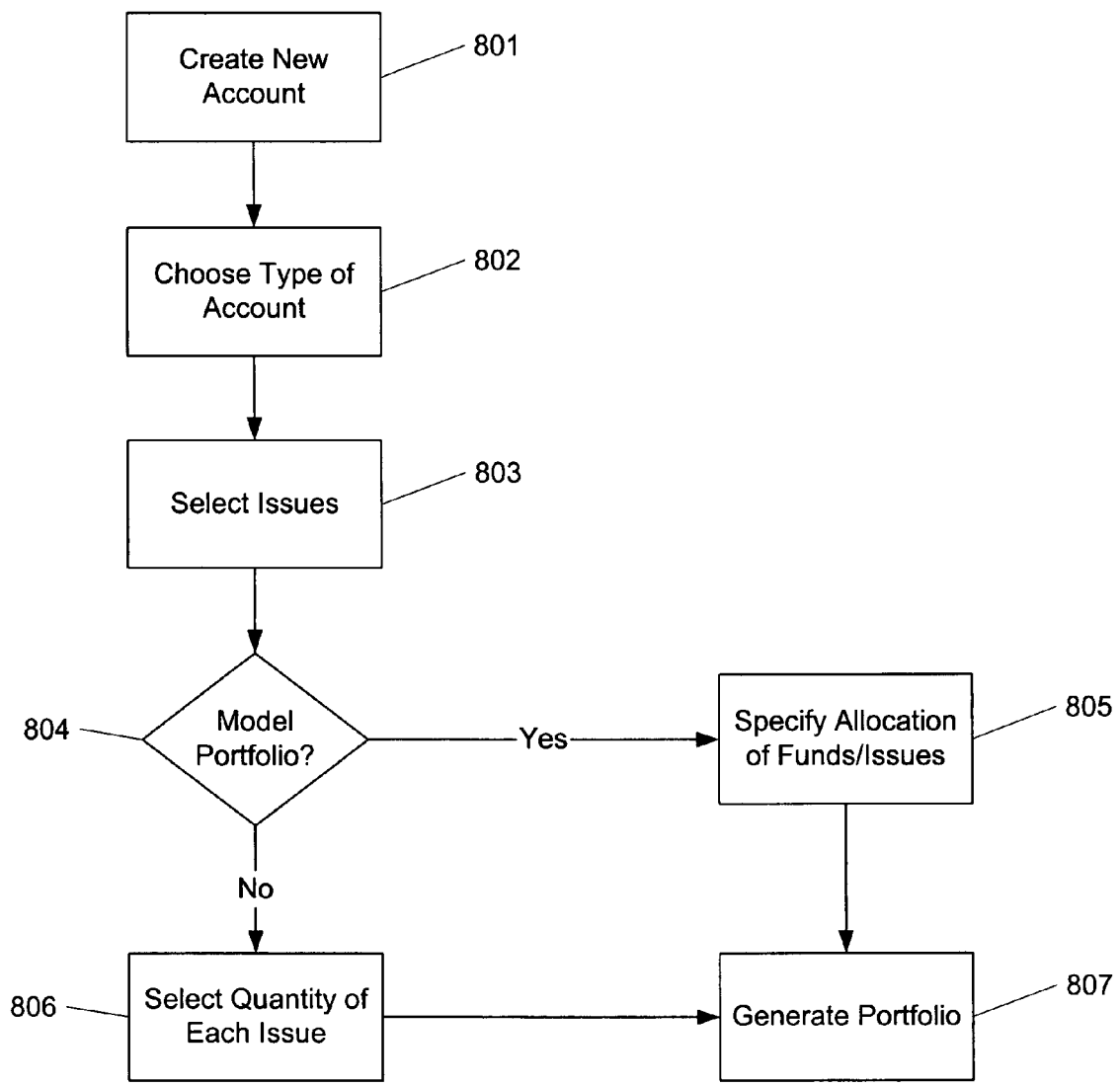
FIG. 8 shows a method for generating a portfolio in accordance with embodiments of the present invention.

FIG. 8 shows a method for generating a portfolio in accordance with embodiments of the present invention. In step 801, a user operates a user interface to indicate that he wants to create a new account. Next, in step 802, the user determines the type of account to be created. In step 803, the user specifies the issues to be added to the account. The system determines in step 804 whether the user specified the account to be a model account.

In an alternate embodiment, step 804 may be a determination of whether the user selected any of the simplified account creation options. In this alternative embodiment, the simplified account creation options are applied to normal accounts in addition to model accounts.

Returning to FIG. 8, if not a model portfolio, then the user is prompted in step 806 to select a quantity of each issue for inclusion in the portfolio. Next, in step 807, the system generates the portfolio. If the portfolio is a model portfolio, then the user is prompted in step 805 A to specify the simplified allocation of funds/number of issues option as described above. Finally, the system generates the portfolio in step 807.

Figure 9:
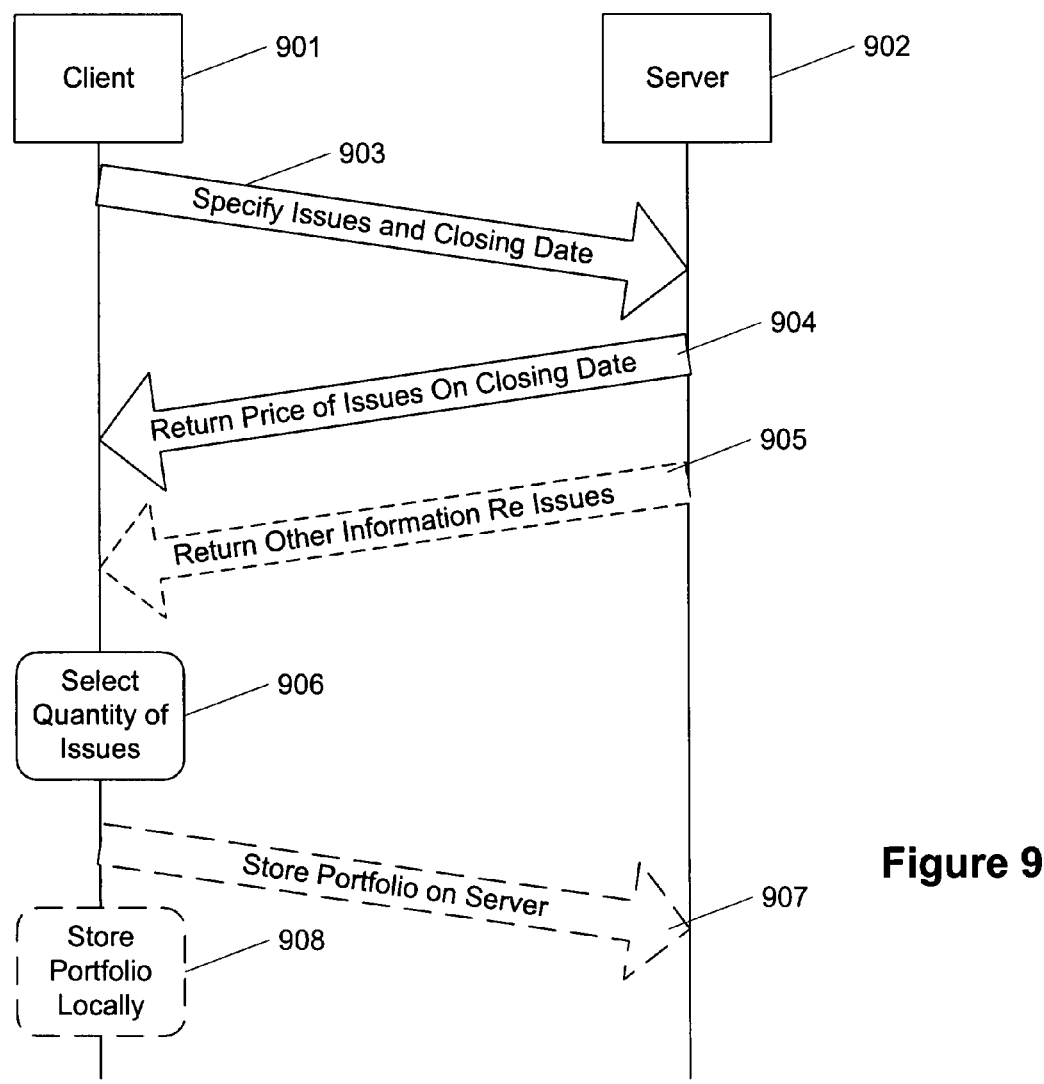
FIG. 9 shows interactions between a client and a server for creating a portfolio in accordance with embodiments of the present invention.

FIG. 9 shows interactions between a client 901 and a server 902 for creating a portfolio in accordance with embodiments of the present invention. First, having received the designated issues to be purchased from the user, the client specifies the issues and the trading closing date that is to be used to calculate the closing price for the issues and passes this information to the server 902 in step 903. Next, in step 904, the server 902 returns the price of the issues on the closing date. Based on the option selected by the user, the client 901 selects the quantity of issues to be purchased in step 906 that satisfy the selected option. Finally, the portfolio is stored. The portfolio may be stored locally (as shown by step 908) or stored on the server (as shown by step 907). Advantages for storing the portfolio locally include minimizing the space needed on the server for storing the portfolio and ensuring that only users of the workstation 201 will have access to the portfolio. Advantages for storing the portfolio on the server 902 include permitting the user to access the portfolio from multiple workstations (for example, home and work) and ensuring the integrity of the portfolio should the workstation 201 fail (for example, experiencing a hard drive crash).

FIG. 9 also shows optional return of other information regarding the issues in step 905. Here, step 905 may include sending information relating to the weighting factors specified by a user. For example, the information transmitted in step 905 may include market capitalization information, risk assessments, industry sector information, PE ratios, value information, dividend information, and recommendations from industry analysts.

Figure 10:
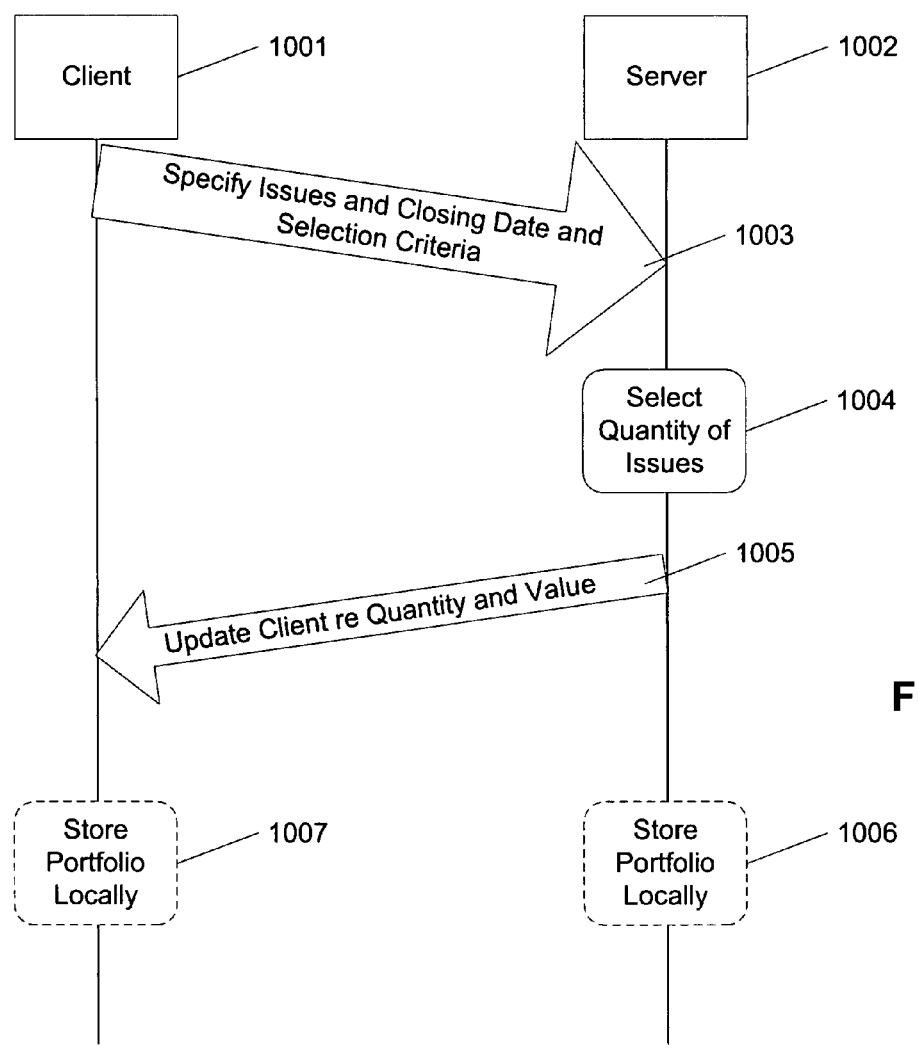
FIG. 10 shows an alternative embodiment of interactions between a client and a server for creating a portfolio in accordance with embodiments of the present invention.

FIG. 10 shows an alternative embodiment of interactions between a client and a server for creating a portfolio in accordance with embodiments of the present invention. FIG. 10 has the selection of the quantity of each issue to be purchased being decided on the server 1002, rather than on the client 1001. In step 1003, the client transmits the specific issues, closing date, and selection criteria to the server. In step 1004, the server 1002 determines the quantity of each issue to add to the portfolio. In step 1005, the client 1001 is updated with the quantity of each issue and the value (or purchase price per share) of each issue purchased. In step 1006, the portfolio is stored on the server. Alternatively, the portfolio is stored on the workstation 201 in step 1007.

When storing the portfolio (steps 907 or 908 or 1006 or 1007), the storage may take the data structure of "symbol (1), quantity (1), symbol (2), quantity (2), . . . " or "symbol (1), symbol (2), . . . quantity (1), quantity (2), . . . " and the like. Other variations of these data structures are considered within the scope of one of ordinary skill in the art.

In the foregoing specification, the present invention has been described with reference to specific exemplary embodiments thereof. Although the invention has been described in terms of various embodiments, those skilled in the art will recognize that various modifications, embodiments or variations of the invention can be practiced within the spirit and scope of the invention as set forth in the appended claims. All are considered within the sphere, spirit, and scope of the invention. The specification and drawings are, therefore, to be regarded in an illustrative rather than restrictive sense. Accordingly, it is not intended that the invention be limited except as may be necessary in view of the appended claims.

We claim:

1. A computer-implemented method for creating a portfolio of issues comprising the steps of:
   receiving user input via a computer identifying specific issues to be added to the portfolio;
   receiving user input via a computer indicating a selection of one of a plurality of options for creating the portfolio;
   receiving user input via a computer indicating a purchase date in the past for the portfolio; and
   creating the portfolio and calculating the portfolio's past performance, using a computer, based on said selection of one of said plurality of options and the past date.

2. The computer-implemented method according to claim 1, wherein said receiving user input indicating the selection includes receiving user input via a computer indicating a selection of an option to allocate a number of shares for each issue.

3. The computer-implemented method according to claim 2, wherein the number of shares is constant for each issue.

4. The computer-implemented method according to claim 2, wherein the number of shares is not constant for each issue.

5. The computer-implemented method according to claim 2, wherein the number of shares for each issue is based on a weighting factor.

6. The computer-implemented method according to claim 1, wherein said receiving user input indicating the selection includes receiving user input via a computer indicating a selection of an option to allocate an equal amount for the purchase of each issue and wherein said equal amount is selected by a user.

7. The computer-implemented method according to claim 1, wherein said receiving user input indicating the selection includes receiving user input via a computer indicating a selection of an option to allocate a total amount for the portfolio.

8. The computer-implemented method according to claim 7, wherein said amount is equally divided between said issues.

9. The computer-implemented method according to claim 7, wherein said amount is not equally divided between said issues.

10. The computer-implemented method according to claim 7, wherein said amount is divided between said issues based on a weighting factor.

11. The computer-implemented method according to claim 1, wherein a historical purchase price for each specific issue in the portfolio is obtained, by the computer, from a historical database, based on the past date.

12. A computer-readable medium having a computer-executable program stored thereon for creating a portfolio of issues, said program comprising the steps of:
   receiving identification of specific issues to be added to the portfolio from a user via a computer;
   receiving a selection of one of a plurality of options for creating the portfolio from a user via a computer;

receiving input indicating a purchase date in the past for the portfolio from a user via a computer; and creating the portfolio and calculating the portfolio's past performance based on said selection of one of said plurality of options and the past date.

13. The computer-readable medium having said program according to claim 12, wherein said receiving the selection includes receiving a selection of an option to allocate a number of shares for each issue from a user via a computer.

14. The computer-readable medium having said program according to claim 13, wherein the number of shares is constant for each issue.

15. The computer-readable medium having said program according to claim 13, wherein the number of shares is not constant for each issue.

16. The computer-readable medium having said program according to claim 13, wherein the number of shares for each issue is based on a weighting factor.

17. The computer-readable medium having said program according to claim 12, wherein said receiving the selection includes receiving a selection of an option to allocate an equal amount for the purchase of each issue and wherein said equal amount is selected by a user.

18. The computer-readable medium having said program according to claim 12, wherein said receiving the selection includes receiving a selection of an option to allocate a total amount for the portfolio from a user via a computer.

19. The computer-readable medium having said program according to claim 18, wherein said amount is equally divided between said issues.

20. The computer-readable medium having said program according to claim 18, wherein said amount is not equally divided between said issues.

21. The computer-readable medium having said program according to claim 18, wherein said amount is divided between said issues based on a weighting factor.

22. The computer-readable medium having said program according to claim 12, wherein a historical purchase price for each specific issue in the portfolio is obtained from a historical database, based on the past date.

23. A system for creating a portfolio of issues comprising:
an input system for receiving a designation of issues from a user, for receiving a designation of an option from a user for creating said portfolio selected from a plurality of options, and for receiving a historical price associated with each of said issues; and
a processor for determining the number of shares of said issues to add to said portfolio and past performance data relating to the portfolio based on said designated option and said historical price.

24. A computer-readable medium having a computer-executable program stored thereon for creating a portfolio of issues, said program comprising the steps of:
receiving identification of specific issues to be added to the portfolio from a user via a computer;
receiving identification of a past closing date for the issues from a user via a computer;
receiving historical prices for the specific issues based on the past closing date;
receiving a selection of a quantity of said specific issues from a user via a computer; and
creating the portfolio based on the specific issues, the selected quantity of the specific issues, and the historical prices.

25. The computer-readable medium according to claim 24, said program further comprising the step of:
storing said portfolio on a client computer.

26. The computer-readable medium according to claim 24, said program further comprising the step of:
storing said portfolio on a server computer.

27. The computer-readable medium according to claim 24, said program further comprising the step of:
receiving other information regarding the specific issues.

28. A computer-implemented method for creating a portfolio of issues comprising the steps of:
receiving user input via a computer identifying specific issues to be added to the portfolio;
receiving user input via a computer identifying a past closing date for the issues;
receiving computer input including historical prices for the specific issues based on the past closing date;
receiving user input via a computer indicating a selection of a quantity of said specific issues; and
creating the portfolio, using a computer, based on the specific issues, the selected quantity of the specific issues, and the historical prices.

29. The computer-implemented method according to claim 28, further comprising the step of:
storing said portfolio on a client computer.

30. The computer-implemented method according to claim 28, further comprising the step of:
storing said portfolio on a server computer.

31. The computer-implemented method according to claim 28, further comprising the step of:
receiving other information regarding the specific issues.

* * * * *